(12) United States Patent
Nag et al.

(10) Patent No.: US 12,122,907 B2
(45) Date of Patent: Oct. 22, 2024

(54) COMPOUNDS, COMPOSITIONS AND METHODS FOR UTILIZATION OF NON-COKING COAL

(71) Applicants: Tata Steel Limited, Jamshedpur (IN); Sreechem Resin Limited, Sundargarh (IN)

(72) Inventors: Debjani Nag, Jamshedpur (IN); Soumitra Ghorai, Jamshedpur (IN); Ajinkya Meshram, Jamshedpur (IN); Bidyut Das, Jamshedpur (IN); Ranjan Kumar Singh, Jamshedpur (IN); Pratik Swarup Dash, Jamshedpur (IN); Binod Sharma, Sundargarh (IN)

(73) Assignees: Tata Steel Limited, Jamshedpur (IN); Sreechem Resin Limited, Sundargarh (IN)

( * ) Notice: Subject to any disclaimer, the term of this patent is extended or adjusted under 35 U.S.C. 154(b) by 459 days.

(21) Appl. No.: 17/436,768

(22) PCT Filed: Mar. 8, 2020

(86) PCT No.: PCT/IB2020/051998
§ 371 (c)(1),
(2) Date: Sep. 7, 2021

(87) PCT Pub. No.: WO2020/183336
PCT Pub. Date: Sep. 17, 2020

(65) Prior Publication Data
US 2022/0186020 A1 Jun. 16, 2022

(30) Foreign Application Priority Data
Mar. 8, 2019 (IN) .............................. 201931009178

(51) Int. Cl.
*C08L 61/06* (2006.01)
*C08G 8/04* (2006.01)
*C10B 57/06* (2006.01)

(52) U.S. Cl.
CPC ................ *C08L 61/06* (2013.01); *C08G 8/04* (2013.01); *C10B 57/06* (2013.01)

(58) Field of Classification Search
CPC ....................................................... C10L 9/10
See application file for complete search history.

(56) References Cited

U.S. PATENT DOCUMENTS 1,576,253 A * 3/1926 Summers .................. C10L 9/10
44/599
2,376,213 A 5/1945 Watson et al.
(Continued)

FOREIGN PATENT DOCUMENTS

FR 2285407 A1 4/1976
JP H04323214 A 11/1992
(Continued)

OTHER PUBLICATIONS

Extended European Search Report; European Patent Office; European Application No. 207771104.5; Apr. 28, 2022; 12 pages.
(Continued)

*Primary Examiner* — Michael M Dollinger
(74) *Attorney, Agent, or Firm* — Taft Stettinius & Hollister LLP (57) ABSTRACT

The present relates to organic compound(s) [i e compound of formula I or compound of formula IA] and/or a composition comprising said organic compound(s) useful for utilization of non-coking coal in a blend comprising coking coal without deterioration of properties of coking coal, wherein said organic compound(s) is capable of releasing hydrogen in the plastic region of coal. The present disclosure
(Continued)

provides a simple, economical, non-toxic and an efficient method for the preparation of said organic polymer and a method for utilization of non-coking coal in blend comprising coking coal without deterioration of properties of coke.

13 Claims, 4 Drawing Sheets

(56) References Cited

U.S. PATENT DOCUMENTS

| | | | | |
|---|---|---|---|---|
| 3,335,124 | A | * | 8/1967 | Larsen .................... C08K 5/39 525/379 |
| 4,326,854 | A | * | 4/1982 | Tanner .................... C10L 5/105 44/577 |
| 4,539,099 | A | * | 9/1985 | Merchant ............... C10G 31/09 210/732 |
| 4,597,775 | A | * | 7/1986 | Billimoria ............... C10J 3/482 201/31 |
| 4,875,979 | A | * | 10/1989 | Orac ........................ C10L 9/02 201/20 |
| 5,536,429 | A | * | 7/1996 | Bennett .................... C10L 9/10 44/620 |
| 2012/0124893 | A1 | * | 5/2012 | McRobbie ............. C10L 10/02 44/280 |
| 2012/0308832 | A1 | * | 12/2012 | Satou .................. H05K 1/0326 525/503 |
| 2016/0257898 | A1 | * | 9/2016 | Fair ........................ C10L 5/406 |

FOREIGN PATENT DOCUMENTS

| | | |
|---|---|---|
| WO | 2009155747 A1 | 12/2009 |
| WO | 2011004495 A1 | 1/2011 |

OTHER PUBLICATIONS

Debjani Nag et al.; Application of Organic Polymer in Coke Making-Tata Steel Scenario; 7th European Coke and Ironmaking Congress (ECIC 2016); Sep. 14, 2016; 22 pages.

E. L. Sorokin et al.; Interaction of Thermosetting Plastics with Clinkering Coal; Coke and Chemistry; Jun. 6, 2012; 3 pages; vol. 55, No. 2.

International Search Report; Indian Patent Office; International Application No. PCT/IB2020/051998; Jun. 22, 2020; 3 pages.

Written Opinion of the International Searching Authority; Indian Patent Office; International Application No. PCT/IB2020/051998; Jun. 22, 2020; 6 pages.

* cited by examiner

COMPOUNDS, COMPOSITIONS AND METHODS FOR UTILIZATION OF NON-COKING COAL

CROSS REFERENCE TO RELATED APPLICATIONS

This application is a U.S. national stage filing of International Patent Application No. PCT/IB2020/051998 filed Mar. 8, 2020, which claims priority to Indian Patent Application No. 201931009178 filed Mar. 8, 2019, the contents of each application are hereby incorporated by reference in their entirety.

TECHNICAL FIELD

The present disclosure generally relates to the field of metallurgy. In particular, the present invention relates to an organic compound(s) [i.e. compound of formula I] and/or a composition comprising said organic compound(s) useful for utilization of non-coking coal in blend comprising coking coal, wherein said organic compound(s) is capable of releasing/liberating hydrogen in the plastic region of coal. The present disclosure provides a simple, economical, non-toxic and an efficient method for the preparation of said organic polymer compound(s) and a method for utilization of non-coking coal in blend comprising coking coal without deterioration of properties of coke.

BACKGROUND OF THE DISCLOSURE

Coke serves very important purposes in a blast furnace process; it is a fuel, reducing agent and is responsible for the permeability of the charge. Because of the numerous functions of coke in blast furnace, stringent quality parameters of its physical and chemical properties are required to ensure smooth operation of high productivity in modern blast furnaces.

As the price of prime coking coal is high and the worldwide reserve of prime coking coal is low, there is a need to develop some alternate carbonaceous material, which can improve the coke quality. Hence, many methods for improving the coking potential of poor coking or non-coking coals have been examined as alternatives to importing more expensive, better quality coals.

From fundamental studies, it has been understood that the coking potential of coal depends on the hydrogen generation/liberation in the temperature range of 350-550° C. Non-coking coal does not show coking properties because in their case temperature of hydrogen generation is much earlier. The present disclosure suggests a polymeric compound which during co-pyrolysis of coal generates hydrogen in the prescribed temperature range and hence improves the coking potential of non-coking coal.

The present disclosure provides a solution to the above said problem by providing an organic compound (polymers, macrocycles and small organic molecules) useful for utilization of non-coking coal in blend without deterioration of properties of coke.

STATEMENT OF THE DISCLOSURE

The present invention achieves these objectives and also exhibits the properties and advantages described herein.

In accordance with one aspect, the present invention provides compounds of formula I:

Compound of Formula I wherein,
'Ar' is either phenyl or naphthyl;
'$R_1$' is either hydrogen or hydroxy, wherein '$R_1$' is attached to 'Ar' moiety at one or more positions;
'm' ranges from 1 to 15 preferably 5 to 15; and
'n' ranges from 10 to 95, with the proviso that compound of Formula IA is not phenol-formaldehyde resin.

In accordance with yet another aspect, the present invention provides compositions comprising compound of formula I, hydrogen donor solvent, carbonaceous material, tackifier and rheological polymers, wherein the rheological polymer is a polymer used to improve the rheological properties (fluidity/plasticity) of coal, wherein the compound of Formula I is Compound of Formula I wherein,
'Ar' is either phenyl or naphthyl;
'$R_1$' is either hydrogen or hydroxy, wherein '$R_1$' is attached to 'Ar' moiety at one or more positions;
'm' ranges from 1 to 15 preferably 5 to 15;
'n' ranges from 10 to 95.

In accordance with another aspect, the present invention provides compounds of formula I:

Phenol-formaldehyde resin

In accordance with still another aspect, the present invention provides a method for utilization of non-coking coal in a blend composition comprising coking coal without deterioration of properties of coke.

BRIEF DESCRIPTION OF FIGURES

In order that the disclosure may be readily understood and put into practical effect, reference will now be made to exemplary embodiments as illustrated with reference to the accompanying figures. The figures together with a detailed description below form a part of the specification, and serve to further illustrate the embodiments and explain various principles and advantages, in accordance with the present disclosure wherein.

DETAILED DESCRIPTION OF THE INVENTION

The foregoing has broadly outlined the features and technical advantages of the present disclosure in order that the detailed description of the disclosure that follows may be better understood. Additional features and advantages of the disclosure will be described hereinafter which form the subject of the description of the disclosure. It should also be realized by those skilled in the art that such equivalent methods do not depart from the scope of the disclosure. The novel features which are believed to be characteristic of the disclosure, as to method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a method that comprises a list of acts does not include only those acts but may include other acts not expressly listed or inherent to such method. In other words, one or more acts in a method proceeded by "comprises . . . a" does not, without more constraints, preclude the existence of other acts or additional acts in the method.

The present disclosure relates to a compound of Formula IA

Compound of Formula IA wherein,

'Ar' is either phenyl or naphthyl;

'$R_1$' is either hydrogen or hydroxy, wherein '$R_1$' is attached to 'Ar' moiety at one or more positions;

'm' ranges from 1 to 15 preferably 5 to 15; and

'n' ranges from 10 to 95, with the proviso that compound of Formula IA is not phenol-formaldehyde resin.

In an embodiment of the present disclosure, the compound of formula IA is selected from a group comprising phenol-acetaldehyde resin, phenol-propanaldehyde resin, naphthol-formaldehyde resin, naphthol-acetaldehyde resin or naphthol-propanaldehyde resin The present disclosure also provides a process for preparing compound of Formula IA comprising act of:

reacting hydroxy-substituted aromatic compound with aliphatic aldehyde or aliphatic aldehyde derivative in presence of a base.

The present disclosure also provides a process for preparing compound of Formula IA comprising act of:

reacting phenol or phenol derivative with formaldehyde or formaldehyde derivative in presence of base.

In an embodiment of the present disclosure, the base is sodium hydroxide

In another embodiment of the present disclosure, the hydroxy-substituted aromatic compound is selected from a group comprising of phenol, one or more hydroxyl group substituted phenol, naphthol, one or more hydroxyl group substituted naphthol.

In another embodiment of the present disclosure, the hydroxy-substituted aromatic compound is phenol.

In still another embodiment of the present disclosure, the aliphatic aldehyde is C1 to C3 aliphatic aldehyde.

In still another embodiment of the present disclosure, the aliphatic aldehyde is formaldehyde.

In still another embodiment of the present disclosure, the hydroxy-substituted aromatic compound and the aliphatic aldehyde is taken at a ratio of about 0.5 to 1:1 to 2; and wherein the process is carried at a temperature ranging from about 70° C. to 90° C.

In another embodiment of the present disclosure, the phenol or phenol derivative and the formaldehyde or formaldehyde derivative is taken at a ratio of about 0.5 to 1:1 to 2; and wherein the process is carried at a temperature ranging from about 70° C. to 90° C.

The present disclosure also provides a composition comprising a compound of formula I, hydrogen donor solvent, carbonaceous material and tackifier.

The present disclosure also provides a composition comprising phenol-formaldehyde resin, hydrogen donor solvent, carbonaceous material and tackifier.

In an embodiment of the present disclosure, the hydrogen donor solvent is selected from a group comprising para octyl phenol solution, sorbitol and isopropanol.

In another embodiment of the present disclosure, the carbonaceous material is graphite based carbonaceous material.

In yet another embodiment of the present disclosure, the graphite based carbonaceous material is selected from a group comprising broken, rejected used and unused graphitic anodes, petroleum coke and combinations thereof.

Synthetic carbonaceous semi-graphitic material was ground to 45 microns in presence of tackifier & rheological polymers, to enable intense mixing and coating of the carbon grains with such chemicals. Broken, rejected, used, un-used anodes and Graphitics Electrodes, having CPC+ Pitch, used as raw material for the synthetic carbon.

In an embodiment of the present disclosure, the tackifier is selected from a group comprising glycols or ethylamine and combinations thereof.

In another embodiment of the present disclosure, the glycol is either ethylene glycol or propylene glycol.

In an embodiment of the present disclosure, the composition causes evolution of hydrogen which plays an important role to stabilise the metaplast in fluidic regime. Thus, the evolution of hydrogen is reason for the enhancement in the coking properties of the coal. Further, the released hydrogen is responsible for accommodating the non-coking coal in the coking coal.

The present disclosure also provides a process for preparing a composition, wherein said process comprising the steps of:
  a) by reacting hydroxy-substituted aromatic compound with aliphatic aldehyde in presence of a base to obtain mixture-I;
  b) cooling the reaction mixture-I to obtain a polymer and water mixture;
  c) distilling the polymer and water mixture obtained from step (b) followed by cooling and maintaining the pH of the solution ranging from about 6.5 to 7.5;
  d) mixing sequentially the product obtained from step (c) with hydrogen donor solvent, carbonaceous material, tackifier and rheological polymers to obtain mixture-II followed by stabilization of the mixture-II to obtain the composition.

In an embodiment of the present disclosure, the mixture-I is a hydroxy-substituted aromatic compound—aliphatic aldehyde resin.

In another embodiment of the present disclosure, the mixture-I is an comprises hydroxy-substituted aromatic compound—aliphatic aldehyde resin, hydrogen donor solvent, carbonaceous material, tackifier and rheological polymers.

The present disclosure also provides a process for preparing a composition, wherein said process comprising the steps of:
  a) by reacting phenol with formaldehyde in presence of a base to obtain mixture-III;
  b) cooling the reaction mixture-III to obtain a polymer and water mixture;
  c) distilling the polymer and water mixture obtained from step (b) followed by cooling and maintaining the pH of the solution ranging from about 6.5 to 7.5;
  d) mixing sequentially the product obtained from step (c) with hydrogen donor solvent, carbonaceous material, tackifier and rheological polymers to obtain mixture-IV followed by stabilization of the mixture-IV to obtain the composition.

In an embodiment of the present disclosure, the mixture-III is a phenol-formaldehyde resin.

In another embodiment of the present disclosure, the mixture-III is an comprises phenol-formaldehyde resin, hydrogen donor solvent, carbonaceous material, tackifier and rheological polymers.

In yet another embodiment of the present disclosure, the process is carried out either in a mixing vessel or a reactor.

In still another embodiment of the present disclosure, the process is carried out either in a reactor containing cooling jacket.

In still another embodiment of the present disclosure, the cooling is carried out in a condenser.

In still another embodiment of the present disclosure, the cooling is carried out by using glycol and amines.

In still another embodiment of the present disclosure, the cooling is carried out at a temperature ranging from about 70° C. to 100° C., preferably at a temperature of about 70° C.

In still another embodiment of the present disclosure, the cooling is carried out at a temperature ranging from about 100 to 40° C., preferably at a temperature of about 50° C.

The present disclosure also provides a method for utilizing a non-coking coal in a blend comprising a coking coal, wherein said method comprises the step of mixing the non-coking coal with coking coal in presence of a composition comprising a compound of formula I, hydrogen donor solvent, carbonaceous material and tackifier, wherein the compound of Formula I is Compound of Formula I wherein, 'Ar' is either phenyl or naphthyl;

'$R_1$' is either hydrogen or hydroxy, wherein '$R_1$' is attached to 'Ar' moiety at one or more positions;

'm' ranges from 1 to 15 preferably 5 to 15;

'n' ranges from 10 to 95.

In an embodiment of the present disclosure, the compound of formula I is selected from a group comprising phenol-formaldehyde resin, phenol-acetaldehyde resin, phenol-propanaldehyde resin, naphthol-formaldehyde resin, naphthol-acetaldehyde resin or naphthol-propanaldehyde resin.

In another embodiment of the present disclosure, the compound of formula I is selected from a group comprising phenol-formaldehyde resin Phenol-formaldehyde resin unit Phenol-formaldehyde resin The present disclosure also provides a method for utilizing a non-coking coal in a blend comprising a coking coal, wherein said method comprises the step of mixing the non-coking coal with coking coal in presence of a composition comprising a phenol-formaldehyde resin, hydrogen donor solvent, carbonaceous material and tackifier.

The present disclosure also provides a blend composition comprising coking coal, non-coking coal, and the composition comprising a compound of formula I, hydrogen donor solvent, carbonaceous material and tackifier, wherein the compound of Formula I is Compound of Formula I wherein, 'Ar' is either phenyl or naphthyl;

'$R_1$' is either hydrogen or hydroxy, wherein '$R_1$' is attached to 'Ar' moiety at one or more positions;

'm' ranges from 1 to 15 preferably 5 to 15;

'n' ranges from 10 to 95.

The present disclosure also provides a blend composition comprising coking coal, non-coking coal, and the composition comprising a phenol-formaldehyde resin, hydrogen donor solvent, carbonaceous material and tackifier.

In an embodiment of the present disclosure, the concentration of coking coal ranges from about 75% to 90%, preferably at a concentration of about 90%.

In another embodiment of the present disclosure, the concentration of non-coking coal ranges from about 5% to 15%, preferably at a concentration of about 9.3%.

In yet another embodiment of the present disclosure, the concentration of composition as claimed in claim 6 ranges from about 0.5% to 1%, preferably at a concentration of about 0.7%.

The present disclosure also provides a method of improving coking potential of coal, comprising acts of:
  contacting the composition, with the coal to obtain the mixture; and heating the mixture, followed by polymerization of coal to obtain coal with improved coking potential.

In an embodiment of the present disclosure, the Crucible Swelling Number (CSN) of the blend composition ranges from about 5 to 7.

In another embodiment of the present disclosure, the Coke Reactivity Indices (CRI) of the blend composition ranges from about 28 to 34.

In an embodiment, the foregoing descriptive matter is illustrative of the disclosure and not a limitation. While considerable emphasis has been placed herein on the particular features of this disclosure, it will be appreciated that various modifications can be made, and that many changes can be made in the preferred embodiments without departing from the principles of the disclosure. Those skilled in the art will recognize that the embodiments herein can be practiced with modification within the spirit and scope of the embodiments as described herein.

EXAMPLES

Example 1: Preparation of Phenol Formaldehyde Resin

About 94.1 equivalent of phenol is reacted with about 60 equivalent formaldehyde under basic conditions in a reactor. Thereafter, the reaction mixture is heated to a temperature of about 70° C. to obtain Phenol-formaldehyde resin. Molar ratio of formaldehyde and phenol is 2:1.

Example 2: Preparation of a Phenol Formaldehyde Polymer

About 94.1 equivalent of phenol is reacted with about 60 equivalent formaldehyde under basic conditions in a reactor. Thereafter, the reaction mixture is heated to a temperature of about 70° C. The temperature of the reactor has been maintained at 80-100° C. by cooling coil. Once the reaction is over, the whole material was passed through a chilled condenser and returned back to the reactor for a time period of 4-hours. In this process, each and every part of phenol was reacted with formaldehyde and the entire mass was converted to a polymer. Now, the reactors contained polymer & water of reaction, which was distilled out in 9-12 hours. The material cooled down to 50° C. by the help of glycol and amines. The pH of the solution was maintained at a level of 6.5 to 7.5.

A solution was prepared by mixing para octyl phenol, sorbitol and isopropanol. This solution acts as hydrogen donor solvent.

Synthetic carbonaceous semi-graphitic material was ground to 45 microns in presence of tackifier & rheological polymers, to enable intense mixing and coating of the carbon grains with such chemicals. Broken, rejected, used, un-used anodes and Graphitic Electrodes, having CPC (Calcined petroleum coke)+Pitch, used as raw material for the synthetic carbon.

All the above materials. (phenolic resin, octyl Phenol based solution and synthetic carbonaceous material) are charged to a blending vessel under sequence mixing and after complete blending of material in the blending reactor, the material is discharged and kept for stabilization reaction. The discharged material is kept in a separate stabilization tank, where they attain a stability at room temperature in 24 hours. The percentage of the phenolic resin solution is kept around 20-35%.

The physical properties of the polymer composite are listed as follows:
  (a) Appearance: Black viscous solution
  (b) Viscosity at 25° C. in Brookfield Viscometer by Spindle No. 4: 2500±500 Cps.
  (c) Viscosity by B-6 cup: 110-130 secs.
  (d) pH: 7.0±1.0
  (e) Specific Gravity: 1.30±0.035
  (f) It is partly soluble in water The material is basically polymeric hybrid compound consisting of phenol-formaldehyde based resin and carbonaceous filler. This liquid hybrid material is the mixture of polar and non-polar component. Herein, hydrophobic segment is mainly consisting of single aromatic based cross-linked polymer. Hydrophilic carbonaceous material is composed of —OH, C=O group of acid derivative and —OCH$_2$R linkage.

Figure 1:
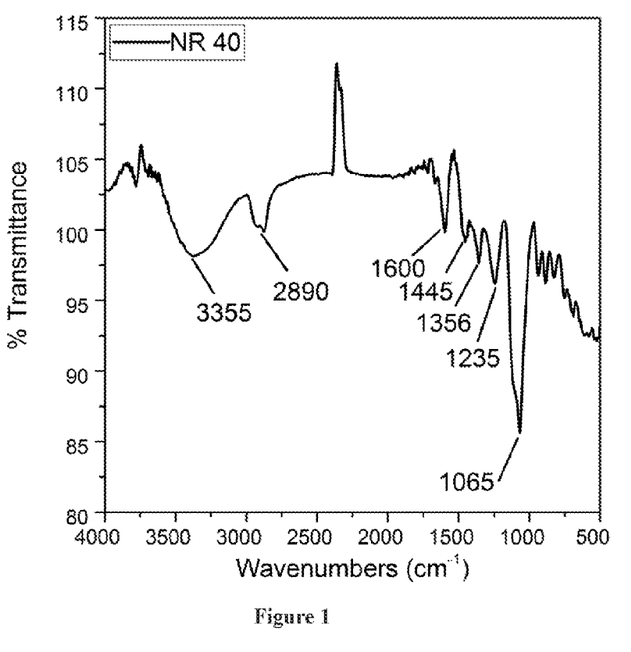
FIG. 1 depicts FTIR spectrum of phenol-formaldehyde resin.

Characterization of the Composite Polymer:

FTIR Spectra Analysis;

The FTIR spectrum of the polymer TSJ-P1 shows the single bond C—O stretching vibrations of —CH$_2$OH group or Carbon nano material at 1065 cm$^{-1}$ and asymmetric stretching vibration of phenolic C—C—OH group at 1235 cm$^{-1}$. The peaks at 1356 cm$^{-1}$ is associated with the C—H bending vibration. The emerging peaks at 1445 cm$^{-1}$ are attributed to —CH$_2$ deformation vibration. An aromatic C=C stretching peak is observed at 1600 cm$^{-1}$. The peak at 2890 cm$^{-1}$ is due to the aliphatic —CH modes. The peaks at 3355 cm$^{-1}$ is associated with the O—H stretching vibration.

Figure 2:
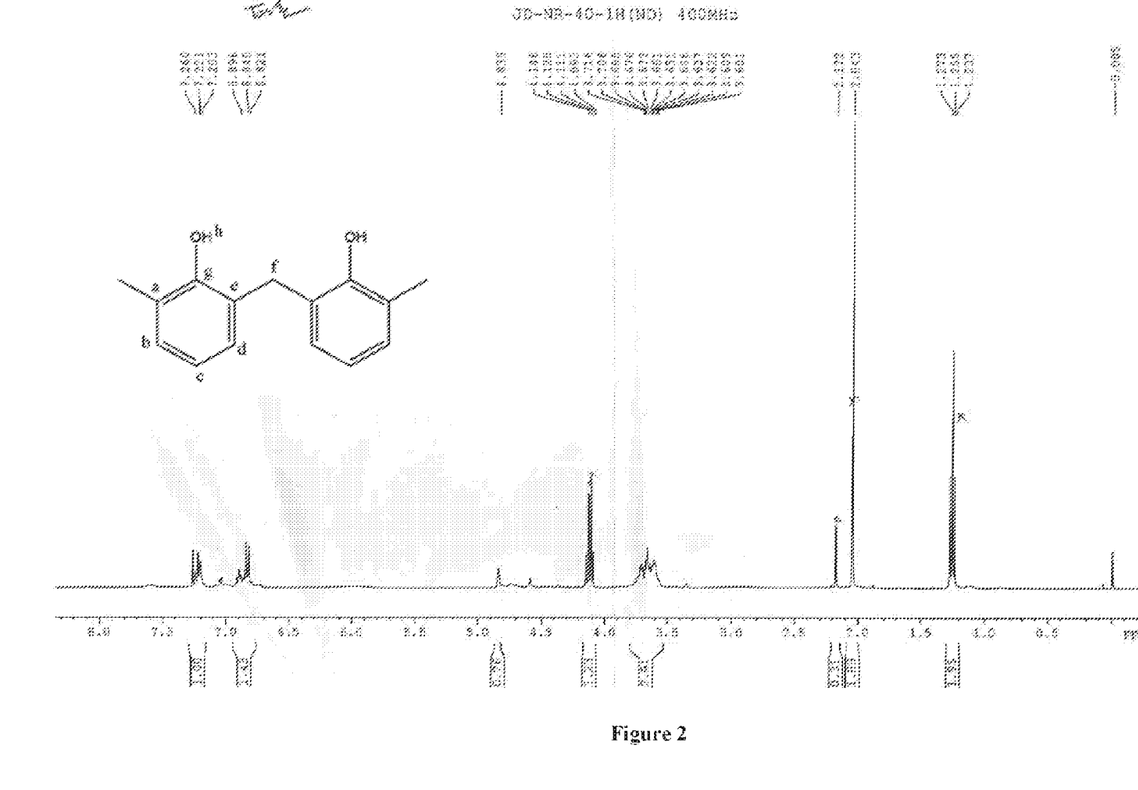
FIG. 2 depicts $^1$H NMR spectrum of phenol-formaldehyde resin.

$^1$H NMR Spectra Analysis:

$^1$H NMR spectrum (400 MHz) of TSJ-P1 provides the existence of different type of proton in the material as discussed below:

For —OH Proton (H$_h$): δ ~7.2, for aromatic —CH proton: δ ~6.8 to 7. In addition, the peak in the region of δ ~4.40 reflects the existence of cross linker unit —CH$_2$, which is attached to aromatic moiety. These peaks basically represent the presence of single aromatic component based resin molecule like phenol-formaldehyde type of compound.

In addition, the sharp and strong peak in the region of δ ~3.457 to 3.490 reflects the existence of heterocyclic moiety like (—$OCH_2R$ or cyclic ether type compound), which could be originate from carbon nano material type material presence in TSJ-P1.

Figure 3:
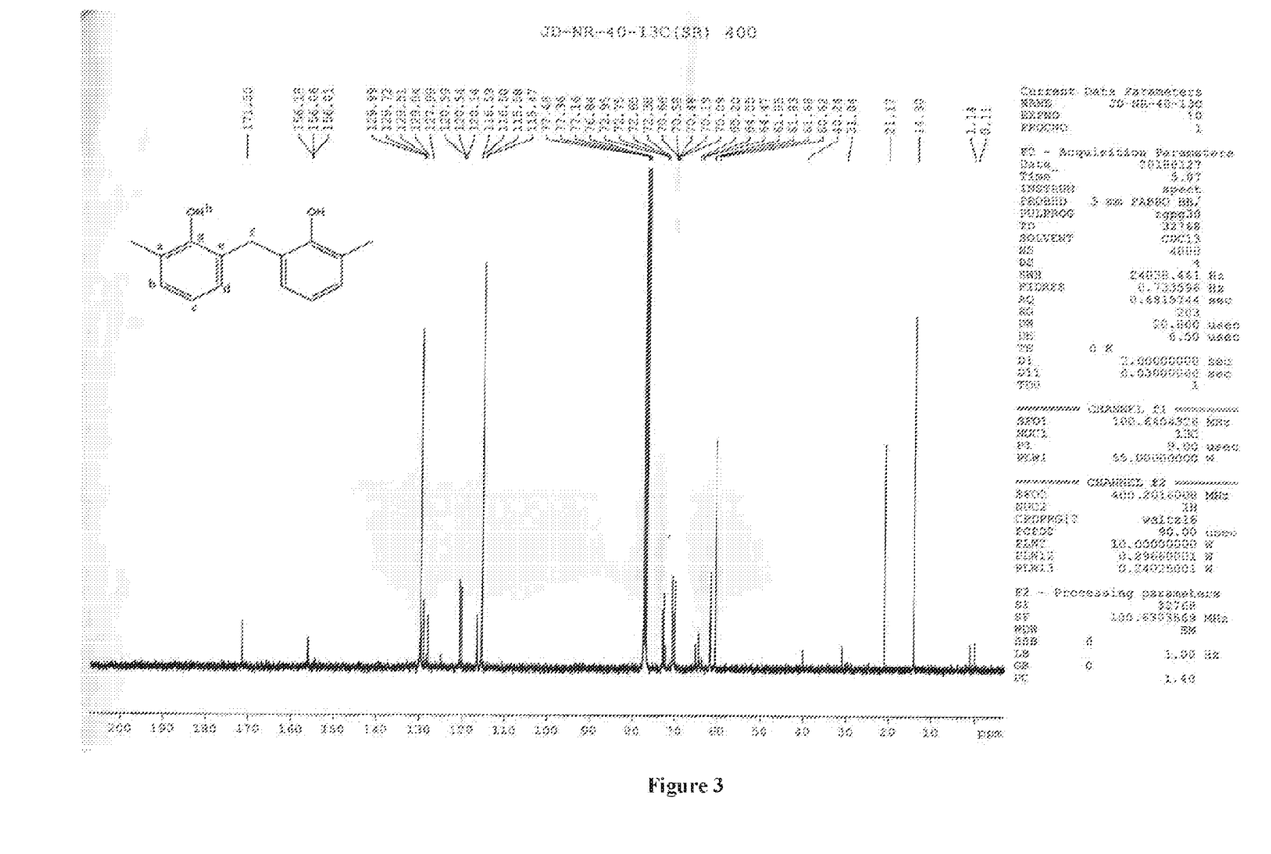
FIG. 3 depicts $^{13}$C NMR spectrum of phenol-formaldehyde resin.

$^{13}$C NMR Spectra Analysis:

$^{13}$C NMR spectrum (400 M Hz) of TSJ-P1 provides the presence of various type of carbon environment as discussed below:

The NMR spectrum of TSJ-P1 provides the characteristics peaks at δ=115.47 to 129.99 reflects the existence of aromatic carbon atoms ($C_a$ to $C_e$). The peak at 156 ppm is associated with carbon atoms ($C_g$) of phenolic —OH groups. The peak at δ=31.04 is assigned to —$CH_2$ carbon atoms, which were formed through the polymerization of the formaldehyde with Phenol and cross-linker is formed. These peaks indicate the existence of phenol-formaldehyde type of compound in the material.

Furthermore, the existence of large number of peaks at δ=60.62 to 70.66 ppm reflects the existence of heterocyclic moiety like (—$OCH_2R$) or cycle ether linkage. In addition, strong peak in the region of δ=14.30 to 21.47 ppm reflects the presence of aliphatic —$CH_3$ group in the material. The peak at δ=171.50 ppm suggest the existence of C═O groups of acid or ester component. This suggest that carbon nano material present in TSJ-P1 might be consist of —$CH_3$ group, C═O group of acid derivative and —$OCH_2R$ type of linkage.

Figure 4:
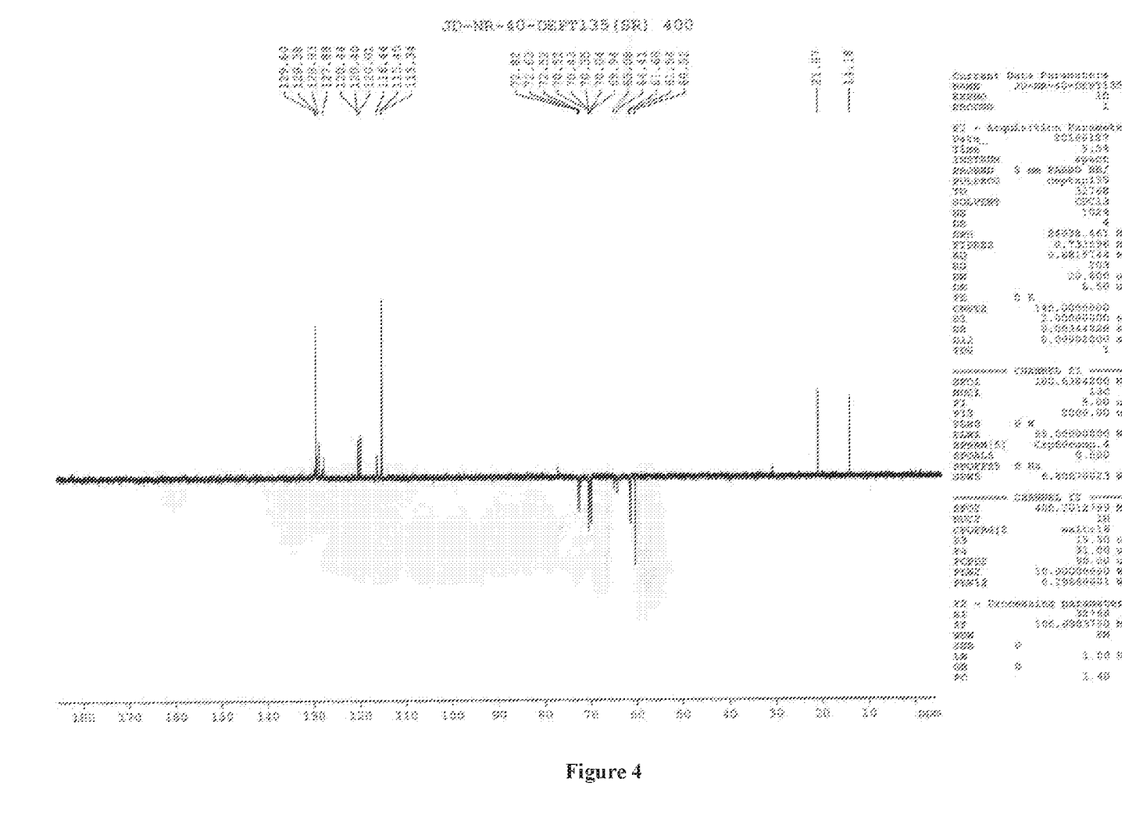
FIG. 4 depicts DEPT Analysis of $^{13}$C NMR spectrum of phenol-formaldehyde resin.

DEPT Analysis of $^{13}$C NMR Spectra:

DEPT 135 analysis of TSJ-P1 represents the existence of aromatic —CH moiety (δ=115.34 to 129.60 ppm, positive signal) present in resin molecule. In addition, the negative signal in the region δ=60.52 to 72.82 ppm in DEPT study clearly indicates the presence of —$OCH_2R$ linkage, which might be arises from Carbon nano material segments of TSJ-P1. Finally, the positive signal in the region of δ=14.18 to 21.07 ppm, reflects the existence of aliphatic —$CH_3$ group, which could present in the CNM of polymeric material.

Example 3: Carbonization Study

After complete characterization of the polymer a series of carbonization tests were designed in the 7 kg carbolite oven. A number of carbonization tests were conducted in the 7-kg test oven, under stamp charging conditions. The series of carbonization tests were carried to study the influence of the polymer in the coke properties. Water was added to the coal blend to obtain the desired value of moisture content. The coal cake was made inside a cardboard box keeping the bulk density 1150 kg/m$^3$. Tests were done with different blends. Initially test carried out with base blend (blend no 1). Then, the hard coking coal from the base blend is replaced by non-coking coal. Optimized quantity of polymer has been added to maintain the coke quality. Before charging the coal cake into the oven, it was ensured that the empty oven temperature is 900±5° C. After 5 hours of carbonization time, the hot coke was pushed out and quenched with water. The coke samples were tested for coke strength after reaction (CSR) and CRI (coke reactivity indices). In Tata Steel coke strength after reaction has been done following the NSC method. In which 200 grams coke of 19-21 mm size is heated in a reaction tube (78 mm diameter×210 mm length) at 1100° C. for two hours during which $CO_2$ is passed at 5 lit/min. The percentage loss in weight of coke during the above reaction is reported as the coke reactivity test (CRI). This reacted coke is further tested by rotating in a I drum (127 mm diameter X725 mm length) for 30 min at a speed of 20 rpm. The coke is then screened on a 10 mm sieve and the % of +10 mm fraction is reported as the coke strength after reaction (CSR).

Carbonization Study Results:

Different coals have been used for blend preparation. Coal A1 and A2 are captive and imported semi soft coal respectively. Coal B1 is imported hard coking coal and coal B2 is captive hard coking coal. Coal C is non-coking coal. Characterization: The coals are characterized in terms of ash, volatile matter (VM), crucible swelling number (CSN) and fluidity. The details of the tests are as follows:

Ash determination: Ash is determined by following ASTM standard D 3174-11. 1 gm of 250 mm size sample is taken to a weighed capsule. Then the sample is placed in a cold muffle furnace and heated gradually at such a rate that the temperature reached 450° C. to 500° C. by 1 hr. At the end of the 2 hr it will reach 950° C. After cooling the weight of the sample then measured and ash is calculated by weight difference.

VM determination: Ash is determined by following ASTM standard D3175-11. In this test 1 gm of 250 mm size sample is taken in a covered platinum crucible and heated in a furnace of 950° C. for 7 min. The VM is calculated by weight difference.

Crucible swelling number: Crucible swelling number test has been done by following ASTM D720-91 (2010). In which 1 gm of sample (40212 mm size) is taken in a translucent squat shaped silica crucible and the sample is leveled by tapping the crucible 12 times. The crucible is covered with a lid and heated under standard conditions, either by a special type of gas burner or muffle furnace. After the test the shape of coke button is compared with a standard chart and accordingly, the crucible swelling number (0 to 9) is assigned to the coal sample.

TABLE 1 presents the properties of different coals.

| Coal | Ash | VM | Crucible Swelling number |
|---|---|---|---|
| A1 | 16.5 | 24.5 | 5 |
| A2 | 8.5 | 19.5 | 5.5 |
| B1 | 18 | 20.8 | 7 |
| B2 | 9 | 24.5 | 8 |
| C | 9.5 | 17.3 | 1.5 |

TABLE 2 represents the blend composition and coking properties.

| | Blend | | | |
|---|---|---|---|---|
| | 1 | 2 | 3 | 4 |
| Component, % | Coal A1-35 | Coal A1-35 | Coal A1-35 | Coal A1-35 |
| | Coal B1-30 | Coal B1-20 | Coal B1-20 | Coal B1-15 |
| | Coal B2-10 | Coal B2-10 | Coal B2-10 | Coal B2-10 |
| | Coal A2-25 | Coal A2-25 | Coal A2-25 | Coal A2-25 |
| | | Coal C-10 | Coal C-9.3 | Coal C-14.3 |
| | | | Polymer-0.7 | Polymer-0.7 |
| CSR | 53.4 | 48 | 54.8 | 53.1 |
| CRI | 29.8 | 33.6 | 30.1 | 30.6 |

Blend 1 is like the base blend of coke plant. In blend 2, 10% of non-coking coal added in place of imported hard coking coal. Result shows that the CSR value has been dropped to 53.4 to 46. In blend 3, 0.7% of polymer has been added. There is an improvement of CSR value of 46 to 53.1. Results revealed that addition of 10% CDPCI in blend along with 0.7% polymer is giving similar value of CSR with base blend.

Above results indicate that 0.7% addition of the polymer has potential to replace around 10% of prime hard coking coal by non-coking coal.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"): the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations." without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A. B. and C" would include but not be limited to systems that have A alone. B alone, C alone, A and B together. A and C together. B and C together, and/or A. B, and C together, etc.). In those instances where a convention analogous to "at least one of A. B, or C, etc." is used, in general such a construction is intended in the sense one having skill in the art would understand the convention (e.g., "a system having at least one of A, B. or C" would include but not be limited to systems that have A alone, B alone, C alone, A and B together, A and C together. B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A composition comprising a compound of formula I, hydrogen donor solvent, carbonaceous material, tackifier and rheological polymers, wherein the rheological polymer is a polymer used to improve the rheological properties of fluidity/plasticity of coal, wherein the compound of Formula I is

Compound of Formula I wherein,
'Ar' is either phenyl or naphthyl;
'R1' is either hydrogen or hydroxy, wherein 'R1' is attached to 'Ar' moiety at one or more positions;
'm' ranges from 1 to 15;
'n' ranges from 10 to 95
wherein the hydrogen donor solvent is selected from a group comprising para octyl phenol, sorbitol, isopropanol and combinations thereof wherein the carbonaceous material is graphite based carbonaceous material; and
wherein the tackifier is selected from a group comprising glycol, ethanolamine and combinations thereof.

2. The composition as claimed in claim 1, wherein the compound of Formula I is selected from a group comprising phenol-formaldehyde resin, phenol-acetaldehyde resin, phenol-propanaldehyde resin, naphthol-formaldehyde resin, naphthol-acetaldehyde resin and naphthol-propanaldehyde resin.

3. The composition as claimed in claim 1, wherein the graphite based carbonaceous material is selected from a group comprising broken, rejected, used and unused graphitic anode, calcined petroleum coke and combinations thereof.

4. The composition as claimed in claim 1, wherein the compound of Formula I is phenol-formaldehyde resin represented by formula:

Phenol-formaldehyde resin wherein n ranges from 10 to 95.

5. A method for preparing the composition as claimed in claim 1, wherein said process comprising steps of:
   a) reacting hydroxy-substituted aromatic compound with aliphatic aldehyde in presence of a base to obtain mixture-I;
   b) cooling the reaction mixture-I to obtain a polymer and water mixture;
   c) distilling the polymer and water mixture obtained from step (b) followed by cooling and maintaining the pH of the solution ranging from about 6.5 to 7.5;
   d) mixing sequentially the product obtained from step (c) with hydrogen donor solvent, carbonaceous material, tackifier and rheological polymers to obtain mixture-II followed by stabilization of the mixture-II to obtain the composition.

6. The method as claimed in claim 5, wherein said process is carried out either in a mixing vessel or a reactor.

7. A method for utilizing a non-coking coal in a blend comprising a coking coal, wherein said method comprises the step of blending the non-coking coal with coking coal in presence of the composition as defined in claim 1.

8. A blend composition comprising coking coal, non-coking coal, and the composition as claimed in claim 1.

9. The blend composition as claimed in claim 8, wherein the concentration of coking coal ranges from about 75% to 90% and wherein the concentration of non-coking coal ranges from about 5% to 15%.

10. A method of improving coking potential of coal, comprising acts of:
    contacting the composition as claimed in claim 1, with coal to obtain a mixture; and
    heating the mixture, followed by polymerization of coal to obtain coal with improved coking potential.

11. The blend composition as claimed in claim 8, wherein Crucible Swelling Number (CSN) of the blend composition ranges from about 5 to 7, wherein Coke Reactivity Indices (CRI) of the blend composition ranges from about 28 to 34.

12. The blend composition as claimed in claim 9, wherein the concentration of the composition ranges from about 0.5% to about 1%.

13. The blend composition as claimed in claim 8, wherein the concentration of the composition ranges from about 0.5% to about 1%.

* * * * *